United States Patent [19]

Jäger

[11] Patent Number: 4,839,469

[45] Date of Patent: Jun. 13, 1989

[54] REACTIVE DISAZO DYESTUFFS HAVING A FLUOROCONTAINING REACTIVE GROUP AND A SULPHATOETHYLSULPHONE SUBSTITUENT

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 120,292

[22] Filed: Nov. 13, 1987

Related U.S. Application Data

[63] Continuation of Ser. No. 847,072, Apr. 1, 1986, abandoned.

[30] Foreign Application Priority Data

Apr. 13, 1985 [DE] Fed. Rep. of Germany ....... 3513261

[51] Int. Cl.⁴ .................. C09B 62/03; C09B 62/09; C09B 62/513; D06P 1/382
[52] U.S. Cl. .................. 534/637; 534/597; 534/642; 534/887
[58] Field of Search .......................... 534/637

[56] References Cited

U.S. PATENT DOCUMENTS

| | | | |
|---|---|---|---|
| 4,329,282 | 5/1982 | Henk | 534/637 |
| 4,425,270 | 1/1984 | Yamada et al. | 534/637 |
| 4,460,505 | 7/1984 | Schundrhutte et al. | 534/637 |
| 4,515,598 | 5/1985 | Meininger et al. | 534/637 |
| 4,551,150 | 11/1985 | Otaue et al. | 534/637 X |
| 4,645,832 | 2/1987 | Niwa et al. | 534/637 |

FOREIGN PATENT DOCUMENTS

| | | | |
|---|---|---|---|
| 0040806 | 12/1981 | European Pat. Off. | 534/637 |
| 3317383 | 11/1984 | Fed. Rep. of Germany | 534/637 |
| 57-57754 | 4/1982 | Japan | 534/637 |
| 2029850 | 3/1980 | United Kingdom | 534/637 |

*Primary Examiner*—Floyd D. Higel
*Attorney, Agent, or Firm*—Sprung Horn Kramer & Woods

[57] ABSTRACT

Dyestuffs of the formula

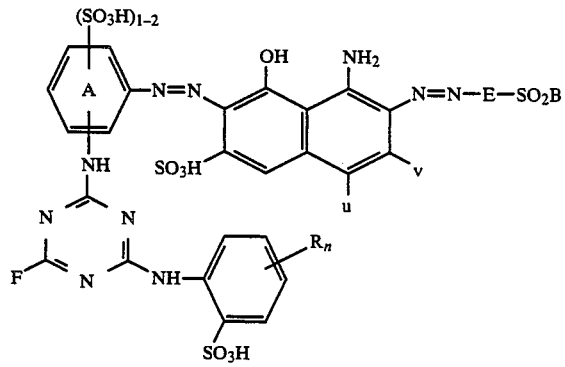

wherein
$B = CH=CH_2$ or $CH_2CH_2OSO_3H$,
u and v = H or $SO_3H$, with u = v,
R = Cl, Br, $C_1$-$C_4$-alkyl, $C_1$-$C_4$-alkoxy, COOH, $SO_3H$, $NHCOCH_3$, $SO_2CH_2CH_2OSO_3H$
n = 0, 1 or 2

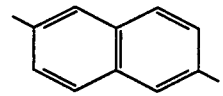

These dyestuffs are outstandingly suitable for the dyeing and printing of materials containing hydroxyl groups or amide groups, such as cellulose, wool and polyamide, and give dyeings with good wet and light fastness properties.

2 Claims, No Drawings

REACTIVE DISAZO DYESTUFFS HAVING A FLUOROCONTAINING REACTIVE GROUP AND A SULPHATOETHYLSULPHONE SUBSTITUENT

This is a continuation of application Ser. No. 847,072, filed Apr. 1, 1986, now abandoned.

The present invention relates to reactive disazo dyestuffs of the formula

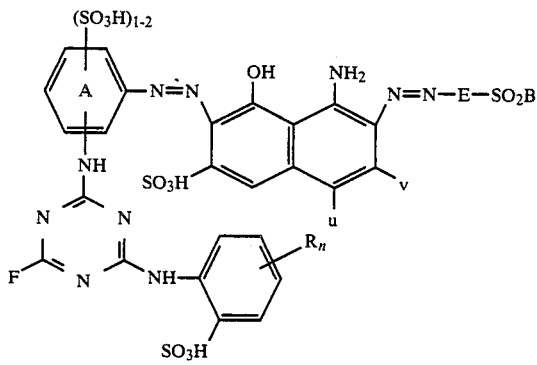
(1)

wherein
- $B = CH=CH_2$ or $CH_2CH_2Z$, wherein $Z = $ a group which can be eliminated,
- u and v = H or $SO_3H$, with u≠v,
- R = a substituent,
- n = 0, 1 or 2

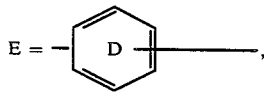

wherein the broken lines represent a possible fused naphthalene ring and the benzene or naphthalene ring D can be substituted, in which case, if

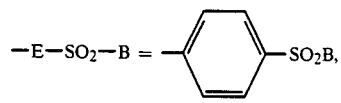

n must represent 1 or 2, and wherein the benzene ring A can be further substituted.

The following are examples of groups Z which can be eliminated:

$Cl$, $Br$, $OSO_3H$, $S_2O_3H$, $OPO_3H_2$ and

The following are examples of substituents R: $Cl$, $Br$, $C_1$–$C_4$-alkyl such as $CH_3$ and $C_2H_5$, $C_1$–$C_4$-alkoxy such as $OCH_3$ and $OC_2H_5$, $COOH$, $SO_3H$, acylamino such as $NHCOCH_3$, and $SO_2CH_2CH_2OSO_3H$.

The following may be mentioned as substituents of the benzene radical A: $CH_3$, $OCH_3$, $OC_2H_5$, $COOH$ and $Cl$.

The following may be mentioned by way of example as substituents of the benzene or naphthalene ring D: $Cl$, $Br$, $C_1$–$C_4$-alkyl such as $CH_3$ and $C_2H_5$, $C_1$–$C_4$-alkoxy such as $OCH_3$ and $OC_2H_5$, acylamino, especially $C_1$–$C_4$-alkylcarbonylamino, $NHCOCH_3$, $COOH$, $SO_3H$ and $SO_2CH_2CH_2OSO_3H$.

Within the scope of formula (1), the following dyestuffs are preferred:

(2)

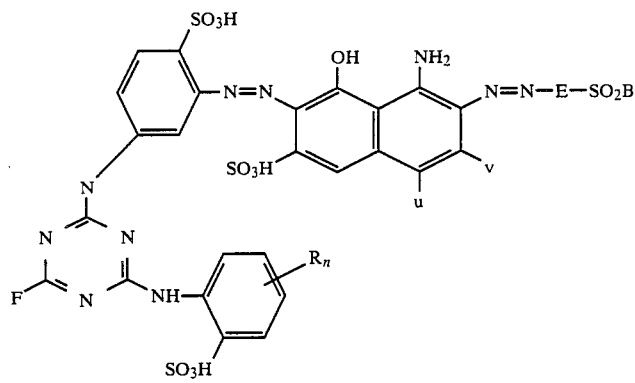
(3)

Those dyestuffs of the formula (1), (2) and (3) are also preferred in which B=CH$_2$CH$_2$OSO$_3$H

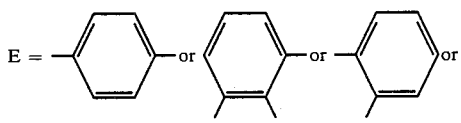

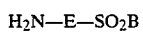

u=H and v=SO$_3$H.

The invention also relates to a process for the preparation of the dyestuffs of the formula (1), which is characterized in that an amine of the formula

H$_2$N—E—SO$_2$B     (4)

is diazotized, coupled in an acid medium with an 8-amino-1-hydroxy-naphthalenesulphonic acid of the formula

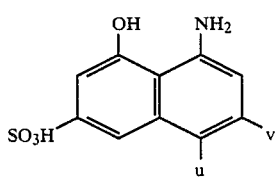
(5)

to give a compound of the formula

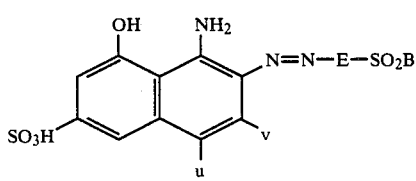
(6)

and this monoazo dyestuff is coupled in a neutral medium with the diazonium compound prepared from an amine of the formula

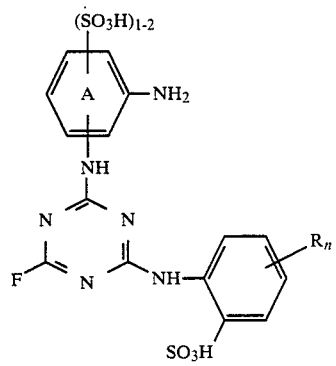
(7)

to give a dyestuff of the formula (1). The compounds of the formula (7) are obtained in a manner known per se by a condensation of diamines of the formula

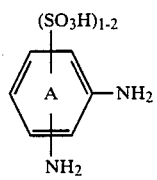
(8)

with a difluorotriazine compound of the formula

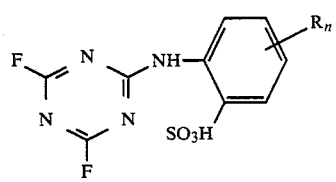
(9)

with elimination of HF.

In the compounds of the formulae (4) to (9), A, B, R, E, u, v and n have the meaning given in formula (1).

The reaction conditions of the preparation correspond to the conditions customary in the field of acylation, diazotization and coupling. Thus, the preparation is preferably carried out in an aqueous medium.

The following may be mentioned by way of example as starting compounds for the preparation of the reactive dyestuffs of the formula (1):

(a) Coupling components of the formula (5)
1-amino-8-hydroxy-naphthalene-3,6-disulphonic acid (H acid)

1-amino-8-hydroxy-naphthalene-4,6-disulphonic acid (K acid)

(b) Diaminobenzene compounds of the formula (8)
1,3-diaminobenzene-4-sulphonic acid
1,4-diaminobenzene-2-sulphonic acid
1,4-diaminobenzene-2,5-disulfonic acid
1,3-diaminobenzene-4,6-disulphonic acid
1,3-diamino-4-methylbenzene-6-sulphonic acid
1,3-diamino-4-chlorobenzene-6-sulphonic acid
1,4-diamino-2-methoxybenzene-5-sulphonic acid
1,4-diamino-2-carboxybenzene-5-sulphonic acid
1,3-diamino-4-carboxybenzene-6-sulphonic acid (c) Amines of the formula (4)
Aniline-4-β-sulphatoethylsulphone, aniline-3-sulphatoethylsulphone, aniline-2-β-sulphatoethylsulphone, aniline-4-β-thiosulphatoethylsulphone, aniline-3-β-thiosulphatoethylsulphone, aniline-2-β-thiosulphatoethylsulphone, aniline-4-β-phosphatoethylsulphone, 4-methoxyaniline-3-β-sulphatoethylSulphone, 4-methoxyaniline-3-β-vinylsulphone, 2,5-dimethoxyaniline-4-β-sulphatoethylsulphone, 2,5-dimethoxyaniline-4-vinylsulphone, 2,5-dimethoxy-aniline-4-β-sulphatoethylsulphone, 2-methoxy-5-methyl-aniline-4-β-SulphatoethylSulphone, 2-methoxy-5-methylaniline-4-β-vinylsulphone, 6-carboxy-aniline-3-β-sulphatoethylsulphone, 6-carboxy-aniline-3-vinylsulphone, 2-sulphoaniline-4-β-sulphatoethylsulphone, 2-sulphoaniline-4-vinylsulphone, 2,4-disulpho-aniline-5-vinylsulphone, 2-hydroxy-aniline-5-β-sulphatoethylsulphone, 2-hydroxy-aniline-4-β-sulphatoethylsulphone, 3-sulpho-2-hydroxy-aniline-5-β-sulphatoethylsulphone, 2-naphthylamine-8-β-sulphatoethylsulphone, 2-naphthylamine-6-β-sulphatoethylsulphone, 1-sulpho-2-naphthylamine-6-β-Sulphatoethylsulphone, 6-sulpho-2-naphthylamine-8-β-sulphatoethylsulphone, 2-aminonaphthalene-6,8-di(β-sulphatoethylsulphone), 2-bromo-1-aminobenzene-4-β-sulphatoethylSulphone and 2,6-dichloro-1-aminobenzene-4-β-sulphatoethylsulphone.

(d) Difluorotriazines of the formula (9)

$$\begin{array}{c} \text{structure with triazine ring bearing two F, linked via NH to benzene with } R_1, R_2, R_3, SO_3H, H \end{array}$$

$R_1$ to $R_3$ representing the following atoms or atom groupings:

| $R_1$ | $R^2$ | $R_3$ |
|---|---|---|
| H | H | H |
| Cl | H | H |
| CH$_3$ | H | H |
| OCH$_3$ | H | H |
| OC$_2$H$_5$ | H | H |
| COOH | H | H |
| NHCOCH$_3$ | H | H |
| H | Cl | H |
| H | SO$_3$H | H |
| H | COOH | H |
| H | NHCOCH$_3$ | H |
| H | OCH$_3$ | H |

-continued

| $R_1$ | $R^2$ | $R_3$ |
|---|---|---|
| Cl | H | Cl |
| Cl | H | CH$_3$ |
| Cl | CH$_3$ | H |
| CH$_3$ | Cl | H |

The reactive dyestuffs of the formula (1) can be isolated and processed to give dry dyeing products. The isolation is preferably effected by salting out and filtration at temperatures which are as low as possible. The dyestuffs which have been filtered off can be dried, optionally after the addition of a mixture of equal parts of monosodium phosphate and disodium phosphate; preferably, the drying is carried out at temperatures which are not unduly high, and under a reduced pressure. The dry products according to the invention can also be prepared directly, that is to say without intermediate isolation of the dyestuffs, by spray-drying of the total preparation mixture.

The reactive dyestuffs of the formula (1) are distinguished by a high reactivity, and they give dyeings having good wet and light fastness properties. It should be particularly emphasized that the dyestuffs show a good solubility and electrolyte solubility coupled with good exhaustion properties and high dyestuff fixing, and that the fractions which have not been fixed can easily be removed. The dyeings can be etched.

The novel dyestuffs of the formula (1) are suitable for the dyeing and printing of materials containing hydroxyl groups or amide groups, such as textile fibres, filaments and fabrics of wool, silk, synthetic polyamide fibres and polyurethane fibres, and for the wash-fast dyeing and printing of native and regenerated cellulose, the treatment of cellulose materials advantageously being carried out in the presence of acid-binding agents and optionally by the action of heat in accordance with the processes which have become known for reactive dyestuffs.

The formulae given are those of the corresponding free acids. The dyestuffs were in general isolated, and employed for dyeing, in the form of the alkali metal salts, in particular the Na salts.

The quantities by weight given in the examples relate to the free acid. The colour indicator numbers given in the examples relate to the Colour Index Hue Indication Chart (Indicator Numbers).

EXAMPLE 1

A mixture of 47.0 g of diazotized 2-fluoro-4-(2'-sulphur-4'-methylphenylamino)-6-(4'''-sulpho-3''-aminophenylamino)-triazine in 800 ml of water is added at pH 6 to 7 and 10°–15° C. to 61.1 g of the dyestuff of the formula $$\text{HO}_3S\text{-naphthalene(OH)(NH}_2\text{)(SO}_3H\text{)-N=N-C}_6H_4\text{-SO}_2CH_2CH_2OSO_3H$$

dissolved in 500 ml of water (prepared by acid coupling of diazotized 4-aminophenyl-β-sulphatoethylsulphone with H acid). After the coupling reaction has ended, the product is salted out and isolated. After drying and grinding, the dyestuff of the formula

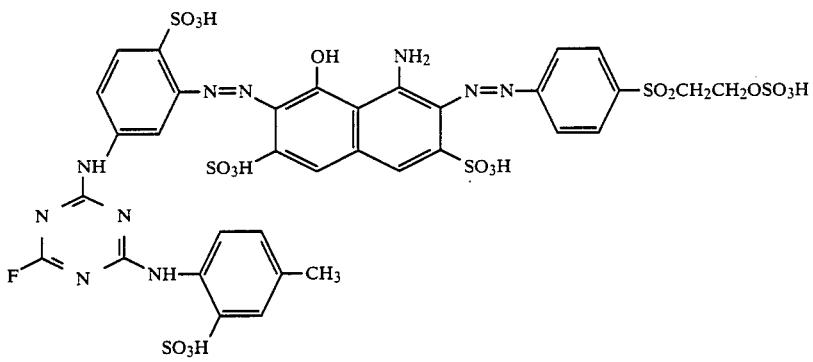

is obtained as a dark powder which dissolves in water with a blue colour and dyes cotton in navy blue (28) to black hues.

The diazo component used in this example can be obtained as follows:

187 g of 1-amino-4-methylbenzene-2-sulphonic acid are dissolved in 4 l of ice water to give a neutral solution. 135 g of 2,4,6-trifluorotriazine are allowed to run in within 20 minutes, the pH being maintained between 6 and 7 by simultaneous addition of 15% sodium carbonate solution. The mixture is stirred at 0° C. for 10 minutes and tested for complete acylation.

If necessary, further 2,4,6-trifluorotriazine must still be added. A neutral solution of 169 g of 1,3-diaminobenzene-4-sulphonic acid in 2 l of water is then added. The condensation is carried out for 1 hour at 0°–5° C. and pH 6–7. The temperature is then allowed to rise to 15°–20° C., the indicated pH being maintained. The resulting solution can be diazotized in the conventional manner.

Further valuable reactive dyestuffs, which dye cotton in the colour hues indicated in Table 1, column 5, are obtained when, according to the instructions in Example 1, the diazotized diazo component indicated in column 2 is coupled under acid conditions with the coupling component indicated in column 3, and the diazotized diazo component indicated in column 4 is coupled with the monoazo compound thus obtained.

| Example | | | | | |
|---|---|---|---|---|---|
| 2 | 1-aminobenzene-4-$\beta$-sulphatoethylsulphone | H acid | 2-fluoro-4-(2'-sulpho-4'-chloro-phenylamino)-6-(3''-amino-4''-sulpho-phenylamino)-triazine | navy blue | 28 |
| 3 | 1-aminobenzene-4-$\beta$-sulphatoethylsulphone | " | 2-fluoro-4-(2'-sulpho-4'-methoxy-phenylamino)-6-(3''-amino-4''-sulpho-phenylamino)-triazine | " | 28 |
| 4 | 1-aminobenzene-2-$\beta$-sulphatoethylsulphone | " | 2-fluoro-4-(2'-sulpho-phenylamino)-6-(3''-amino-4''-sulpho-phenylamino)-triazine | " | 28 |
| 5 | 1-aminobenzene-3-$\beta$-sulphatoethylsulphone | " | 2-fluoro-4-(2'-sulpho-phenylamino)-6-(3''-amino-4''-sulpho-phenylamino)-triazine | " | 28 |
| 6 | 1-aminobenzene-4-$\beta$-sulphatoethylsulphone | K acid | 2-fluoro-4-(2'-sulpho-4'-methyl(-phenylamino)-6-(3''-amino-4''-sulpho-phenylamino)-triazine | reddish-tinged navy blue | 38 |
| 7 | 1-aminobenzene-4-$\beta$-sulphatoethylsulphone | H acid | 2-fluoro-4-(2'-sulpho-4'-chloro-phenylamino)-6-(4''-amino-3''-sulpho-phenylamino)-triazine | greenish-tinged navy blue | 39 |
| 8 | 1-aminobenzene-4-$\beta$-thio-sulphatoethylsulphone | " | 2-fluoro-4-(2'-sulpho-4'-chloro-phenylamino)-6-(4''-amino-3''-sulpho-phenylamino)-triazine | greenish-tinged navy blue | 39 |
| 9 | 1-aminobenzene-4-$\beta$-thio-sulphatoethylsulphone | K acid | 2-fluoro-4-(2'-sulpho-4'-chloro-phenylamino)-6-(4''-amino-3''-sulpho-phenylamino)-triazine | navy blue | 28 |
| 10 | 2-amino-naphthalene-6-$\beta$-sulphatoethylsulphone | H acid | 2-fluoro-4-(2'5'-disulpho-phenylamino)-6-(3''-amino-4''-sulpho-phenylamino)-triazine | " | |
| 11 | 2-amino-naphthalene-6-$\beta$-sulphatoethylsulphone | K acid | 2-fluoro-4-(2'5'-disulpho-phenylamino)-6-(3''-amino-4''-sulpho-phenylamino)-triazine | reddish-tinged navy blue | 38 |
| 12 | 2-amino-naphthalene-8-$\beta$-sulphatoethylsulphone | H acid | 2-fluoro-4-(2'5'-disulpho-phenylamino)-6-(3''-amino-4''-sulpho-phenylamino)-triazine | navy blue | 28 |
| 13 | 2-amino-naphthalene-8-$\beta$-sulphatoethylsulphone | K acid | 2-fluoro-4-(2'5'-disulpho-phenylamino)-6-(3''-amino-4''-sulpho-phenylamino)-triazine | reddish-tinged navy blue | 38 |
| 14 | 2-amino-naphthalene-6,8-di-$\beta$-sulphatoethylsulphone | H acid | 2-fluoro-4-(2'5'-disulpho-phenylamino)-6-(3''-amino-4''-sulpho-phenylamino)-triazine | navy blue | 28 |
| 15 | 2-amino-naphthalene-6,8-di-$\beta$-sulphatoethylsulphone | K acid | 2-fluoro-4-(2'5'-disulpho-phenylamino)-6-(3''-amino-4''-sulpho-phenylamino)-triazine | reddish-tinged navy blue | 38 |
| 16 | 1-amino-2-sulphobenzene-4-$\beta$-sulphatoethylsulphone | H acid | 2-fluoro-4-(2'-sulpho-phenylamino)-6-(3''-amino-4''-sulpho-phenylamino)-triazine | navy blue | 28 |
| 17 | 1-amino-2-methylbenzene 5-$\beta$-sulphatoethylsulphone | " | 2-fluoro-4-(2'-sulpho-phenylamino)-6-(3''-amino-4''-sulpho-phenylamino)-triazine | " | |
| 18 | 1-amino-2,5-dimethoxy-4-$\beta$-sulphatoethylsulphone | " | 2-fluoro-4-(2'-sulpho-phenylamino)-6-(3''-amino-4''-sulpho-phenylamino)-triazine | " | |
| 19 | 2-amino-naphthalene-6-$\beta$-sulphatoethylsulphone | " | 2-fluoro-4-(2'-sulpho-phenylamino)-6-(3''-amino-4''-sulpho-phenylamino)-triazine | " | |
| 20 | 2-amino-naphthalene-6-$\beta$-sulphatoethylsulphone | K acid | 2-fluoro-4-(2'-sulpho-phenylamino)-6-(3''-amino-4''-sulpho-phenylamino)-triazine | reddish-tinged navy blue | 38 |
| 21 | 2-amino-naphthalene-8-sulphatoethylsulphone | H acid | 2-fluoro-4-(2'-sulpho-phenylamino)-6-(3''-amino-4''-sulpho-phenylamino)-triazine | navy blue | 28 |
| 22 | 2-amino-naphthalene-8-sulphatoethylsulphone | K acid | 2-fluoro-4-(2'-sulpho-phenylamino)-6-(3''-amino-4''-sulpho-phenylamino)-triazine | reddish-tinged navy blue | 38 |
| 23 | 2-amino-naphthalene-6,8- | H acid | 2-fluoro-4-(2'-sulpho-phenylamino)-6- | navy blue | 28 |

-continued

| Example | | | | | |
|---|---|---|---|---|---|
| 24 | di-β-sulphatoethylsulphone 2-amino-naphthalene-6,8-di-β-sulphatoethylsulphone | K acid | (3″-amino-4″-sulpho-phenylamino)-triazine 2-fluoro-4-(2′-sulpho-phenylamino)-6-(3″-amino-4″-sulpho-phenylamino)-triazine | reddish-tinged navy blue | 38 |
| 25 | 1-aminobenzene-4-β-sulphatoethylsulphone | H acid | 2-fluoro-4-(2′-sulpho-4′-methyl-phenylamino)-6-(4″-amino-3″-sulpho-phenylamino)-triazine | greenish-tinged navy blue | 39 |
| 26 | 1-aminobenzene-4-β-sulphatoethylsulphone | K acid | 2-fluoro-4-(2′-sulpho-4′-methyl-phenylamino)-6-4″-amino-3″-sulpho-phenylamino)-triazine | navy blue | |
| 27 | 1-aminobenzene-4-β-sulphatoethylsulphone | H acid | 2-fluoro-4-(2′-sulpho-4′-methoxy-phenylamino)-6-(4″-amino-3″-sulpho-phenylamino)-triazine | greenish tinged navy blue | 39 |
| 28 | 1-aminobenzene-4-β-thio-sulphatoethylsulphone | " | 2-fluoro-4-(2′-sulpho-phenylamino)-6-(3″-4″-sulpho-phenylamino)-triazine | navy blue | 28 |
| 29 | 1-aminobenzene-4-β-thio-sulphatoethylsulphone | K acid | 2-fluoro-4-(2′-sulpho-phenylamino)-6-(3″-amino-4″-sulpho-phenylamino)-triazine | reddish-tinged navy blue | 38 |
| 30 | 1-aminobenzene-4-β-phosphatoethylsulphone | H acid | 2-fluoro-4-(2′-sulpho-phenylamino)-6-(3″-amino-4″-sulpho-phenylamino)-triazine | navy blue | 28 |

What is claimed is:

1. A reactive dyestuff of the formula

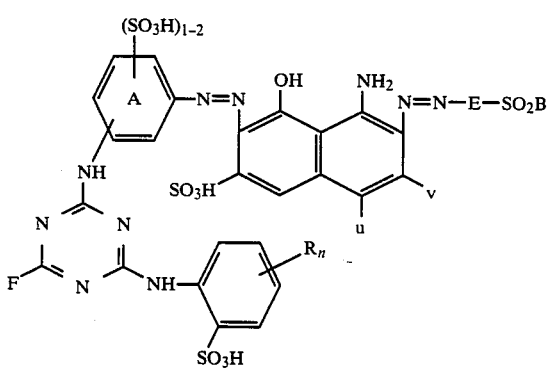

wherein
B=CH=CH$_2$ or CH$_2$CH$_2$OSO$_3$H,
u and v=H or SO$_3$H, with u≠v,
R=Cl, Br, C$_1$–C$_4$-alkyl, C$_1$–C$_4$-alkoxy, COOH, SO$_3$H, NHCOCH$_3$, SO$_2$CH$_2$CH$_2$OSO$_3$H
n=0, 1 or 2

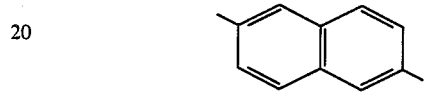

2. a dyestuff according to claim 1, of the formula

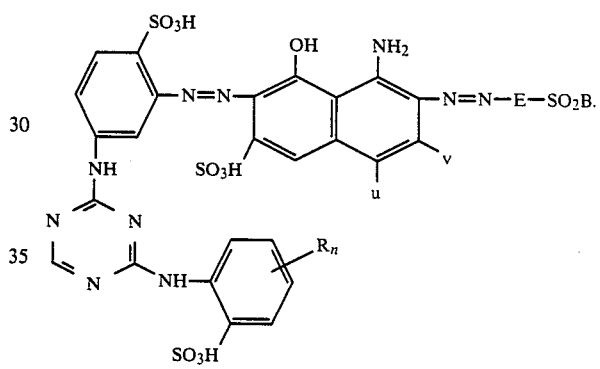

* * * * *

UNITED STATES PATENT AND TRADEMARK OFFICE
CERTIFICATE OF CORRECTION

PATENT NO. : 4,839,469

DATED : June 13, 1989

INVENTOR(S) : Horst Jager

It is certified that error appears in the above-identified patent and that said Letters Patent is hereby corrected as shown below:

Title Page — U.S. PATENT DOCUMENTS: After " 4,460,505, 7/1984" delete " Schunderhutte " and substitute -- Schundehutte -- and after " 4,551,150, 11/1985 " delete " Otaue " and substitute -- Otake --

Title Page — FOREIGN PATENT DOCUMENTS: Add -- 3201114, 7/1983, Fed Rep of Germany --

Title Page — ABSTRACT: Line 9, after and under "n=0, 1 or 2" insert -- E= --

Signed and Sealed this

Twenty-fifth Day of August, 1992

Attest:

DOUGLAS B. COMER

*Attesting Officer* — *Acting Commissioner of Patents and Trademarks*

UNITED STATES PATENT AND TRADEMARK OFFICE
CERTIFICATE OF CORRECTION

PATENT NO. : 4,839,469

DATED : June 13, 1989

INVENTOR(S) : Horst Jager

It is certified that error appears in the above-identified patent and that said Letters Patent is hereby corrected as shown below:

Title Page      ABSTRACT: Line 5 after " SO3H, with " delete " u=v " and substitute -- u ≠ v --

Col. 10, line 36   Delete " 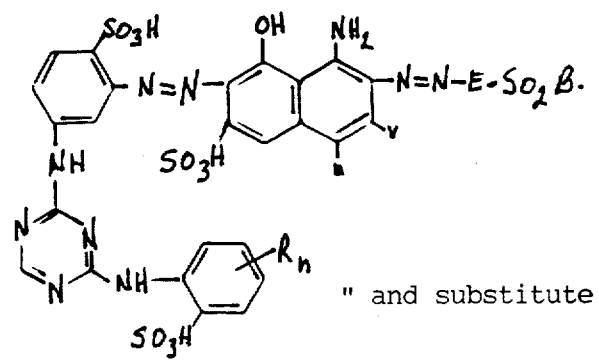 " and substitute

UNITED STATES PATENT AND TRADEMARK OFFICE
CERTIFICATE OF CORRECTION

PATENT NO. : 4,839,469

DATED : June 13, 1989

INVENTOR(S) : Horst Jager

It is certified that error appears in the above-indentified patent and that said Letters Patent is hereby corrected as shown below:

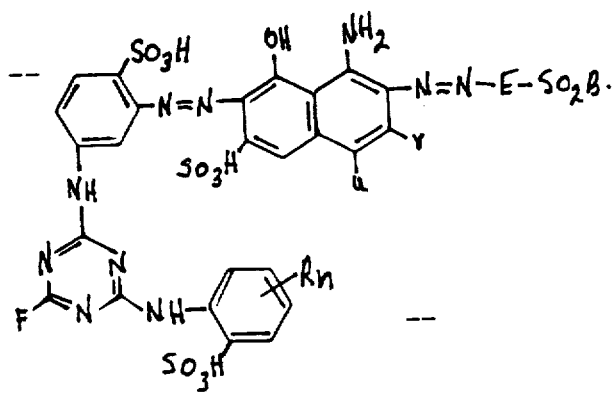

Signed and Sealed this

Nineteenth Day of April, 1994

*Attest:*

BRUCE LEHMAN

*Attesting Officer*   *Commissioner of Patents and Trademarks*